UNITED STATES PATENT OFFICE.

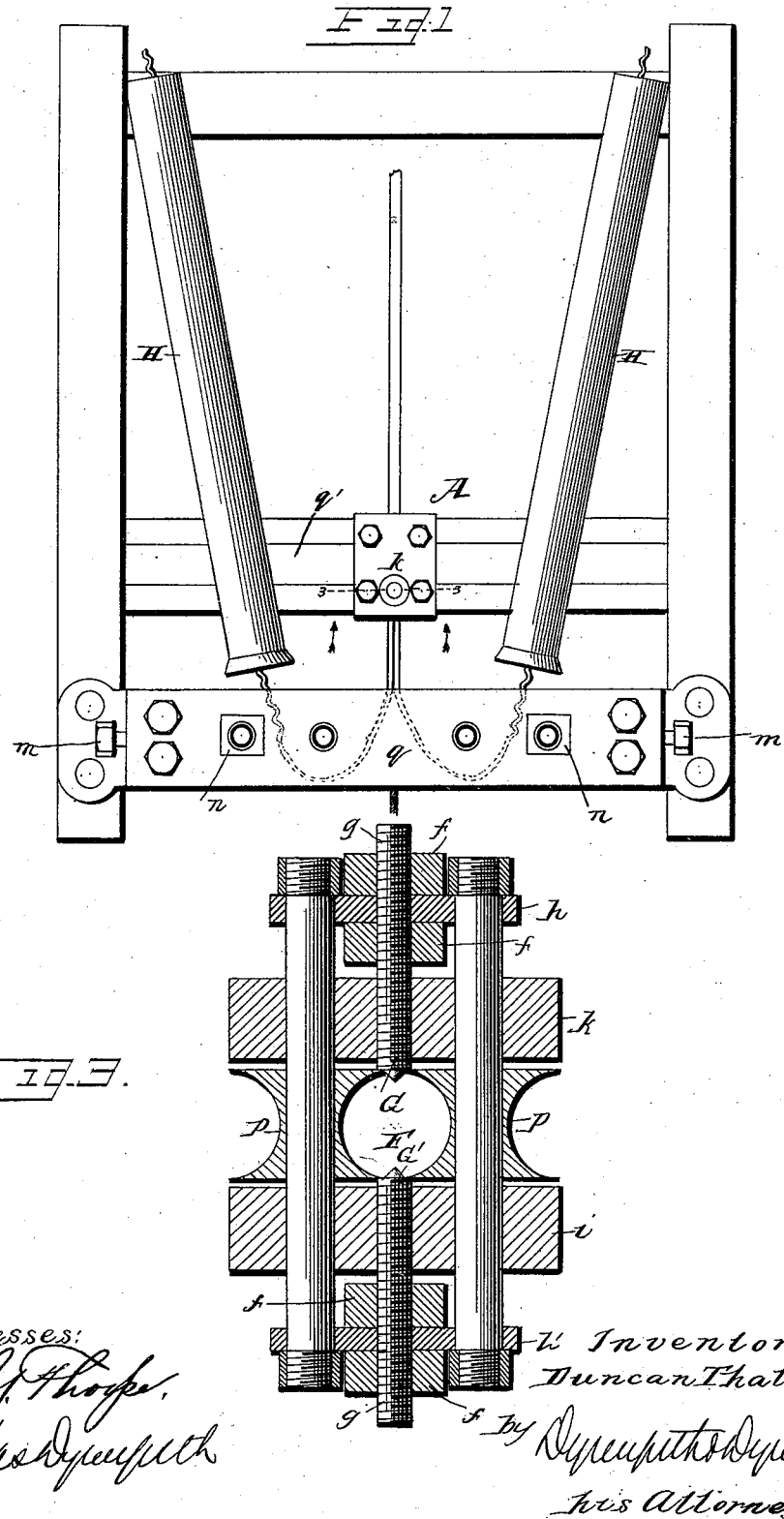

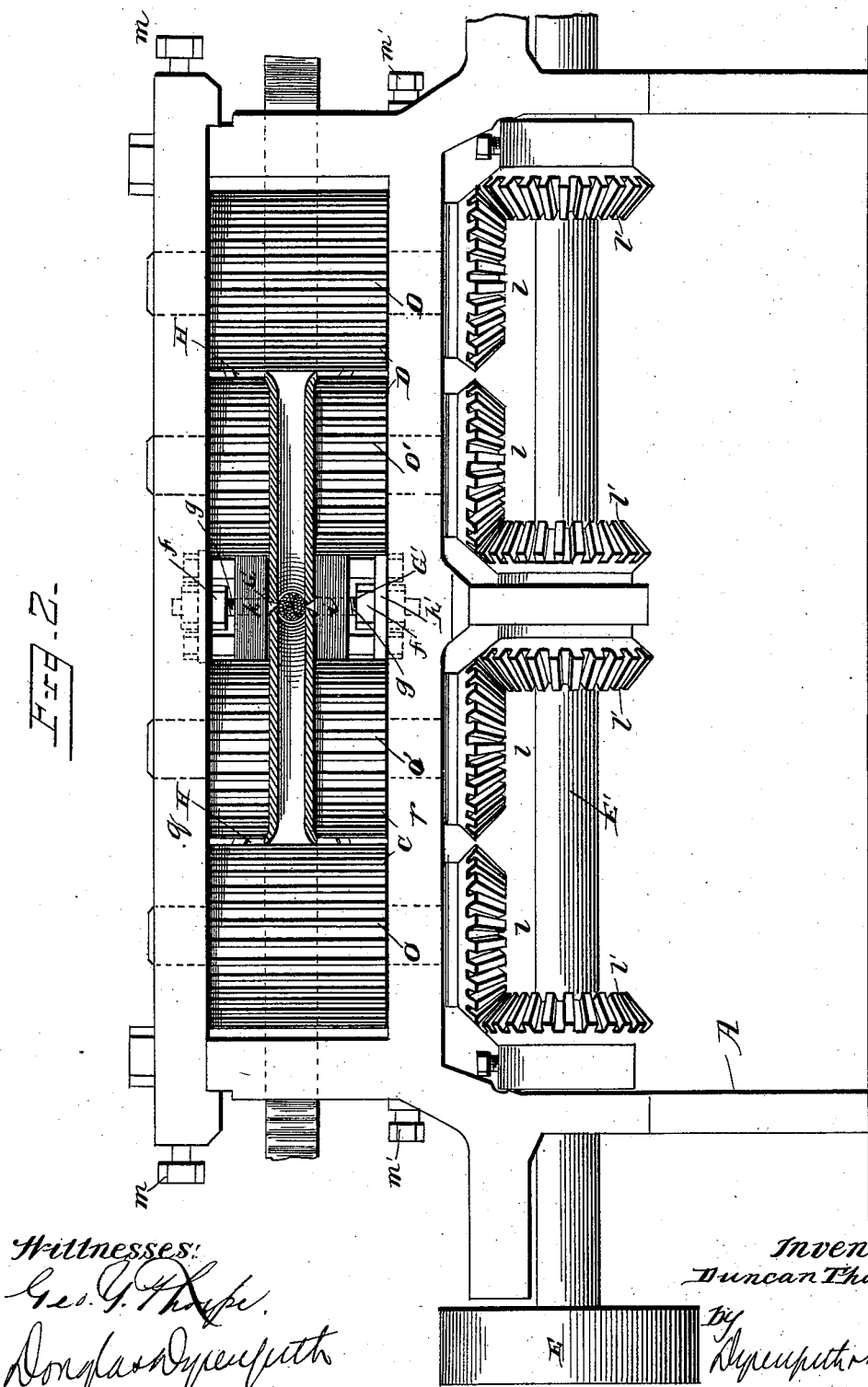

DUNCAN THATCHER, OF WILMINGTON, DELAWARE, ASSIGNOR TO THE COBB VULCANITE WIRE COMPANY, OF DELAWARE.

MACHINE FOR STRIPPING THE LEAD COVERING FROM CONDUCTORS.

SPECIFICATION forming part of Letters Patent No. 429,292, dated June 3, 1890.

Application filed November 8, 1889. Serial No. 329,637. (No model.)

*To all whom it may concern:*

Be it known that I, DUNCAN THATCHER, a citizen of the United States, residing at Wilmington, in the county of New Castle and State of Delaware, have invented a new and useful Improvement in Machines for Stripping the Lead Covering from Conductors, of which the following is a specification.

My invention relates to a machine devised by me for the purpose of stripping the lead covering from metal-covered insulated electric conductors.

It is not an uncommon occurrence that the lead covering of insulated electric wire requires to be removed, owing to one cause or another; and the object of my invention is provide a machine whereby the stripping may be done readily and rapidly.

In the accompanying drawings, Figure 1 is a plan view of my improved machine. Fig. 2 is a view of the same in front elevation; and Fig. 3, an enlarged vertical view of the cutter on the line 3 3, Fig. 1, and viewed in the direction of the arrows.

A is the frame of the machine, supporting toward its forward end a bearing B in the form of a lower metal bar $r$ and a similar bar $q$ directly over the bar $r$ and rigidly connected with the latter at opposite ends, leaving a space between the two for the accommodation of the friction-rollers. These rollers are provided in two pairs C and D, and are preferably in the form of longitudinally-fluted rollers, the rollers $o$ and $o'$, of which each pair is composed being journaled adjacent to each other at their opposite ends in the bars $r$ and $q$ toward the opposite extremities of the space between them. The outer member $o$ of each set of the rollers is journaled at its opposite ends in boxes $n$, adjustably supported in the bars $r$ and $q$, and set-screws $m$ and $m'$ extend against them from opposite sides of the frame to adjust the distance of the rollers $o$ from their respectively-adjacent companion rollers $o'$. The lower journal of each of the friction-rollers extends beyond its bearing, and there carries a beveled gear-wheel $l$.

E is the belt-pulley on a rotary shaft E', supported in the frame A to extend across the ends of the lower journals of the friction-rollers $o$ and $o'$, and carrying beveled gear-wheels $l'$ at intervals to mesh with the gears $l$, as shown, in a manner to cause by the rotation of the shaft E' the members of each pair C and D to rotate in opposite directions.

Behind the bars $r$ and $q$ is a bar $q'$, affording a bearing for the cutter F, supported on a plane between the inner rollers $o'$. The cutter comprises a top plate $k$ and a bottom plate $i$, secured together near their several corners by bolts, those at the front affording the shafts for a pair of anti-friction rollers $p$ and those at the rear affording the shafts for a pair of anti-friction rollers (not shown) similar to the rollers $p$, the said rollers being thus between the plates $k$ and $i$. The bolts affording the shafts for the forward pair of rollers $p$ extend at opposite ends beyond the top and bottom plates of the cutter, and the adjacent projecting ends at the top support a cross-head $h$, having an opening in its center, while those at the bottom support a similar cross-head $h'$, the cross-heads being secured in place by nuts, as shown.

G and G' are respectively the upper and the lower knife, each comprising a threaded stem $g$, pointed or sharpened at one end to afford the cutting extremity, the stems of the two knives being extended toward and in line with each other through their respective bearings afforded by the perforated cross-heads $h$ and $h'$ and adjustably secured in each by nuts $f$ upon each stem $g$ at opposite sides of its supporting cross-head. The cutting portions of the knives thus project toward each other between the forward pair of anti-friction rollers $p$, the extent of projection being adjustable to correspond with the thickness of the lead to be severed from the wire.

Behind each pair of friction-rollers C and D, I provide a guide for the severed metal, preferably, as shown, in the form of a tube H, extending from near the center of each pair and in an outward direction diagonal to the top of the frame.

The operation of the machine is as follows: An end of the lead-covered wire to be operated upon is drawn from a reel (not shown) through the cutter F beyond the forward sides of and between the pairs of rollers C and D, such length as is drawn between the cutting ends of the two knives thereby having the lead covering cut to or about to the insulated surface of the wire. The severed lengths of the lead are then bent laterally in opposite directions backward, and each is extended between the respectively-adjacent pair of rollers C and D and directed through the space between the latter into its guide-tube H. The shaft E' is then rotated rapidly, causing the rollers o o' to draw the lead-coated wire from the reel between the cutting-points of the knives, separate the severed lead into two strips, and lead them through the guide-tubes away from the machine.

My improvement may of course be used for other purposes than the specific purpose described, and I do not therefore wish to be understood as limiting it to the exact purpose set forth, nor to the exact details of construction illustrated and described, since these may be variously modified without thereby departing from the principle of my construction.

What I claim as new, and desire to secure by Letters Patent, is—

1. In a stripping-machine, the combination, with a supporting-frame, of friction-rollers suitably geared to the driving mechanism and a cutter having its knife projecting into the path of feed of the material to be stripped, substantially as described.

2. In a stripping-machine, the combination, with a supporting-frame, of pairs of friction-rollers suitably geared to the driving mechanism and a cutter supported in a plane between the said pairs of friction-rollers and having its knives projecting in different directions into the path of feed of the material to be stripped, substantially as described.

3. In a stripping-machine, the combination, with a supporting-frame, of pairs C and D of friction-rollers, a driving-shaft E', to which the said rollers are geared to cause the rotation of the shaft to rotate the members of each said pair in opposite directions, and a cutter F, supported on a plane between and behind the said pairs of friction-rollers and having its knives projecting in different directions into the path of feed of the material to be stripped, substantially as described.

4. In a stripping-machine, the combination, with a supporting-frame, of pairs C and D of friction-rollers, journaled in bearings r and q toward opposite sides of the frame and the members o of which are adjustably supported in their journal-bearings, a driving-shaft E', to which the said rollers are geared to cause the rotation of the shaft to rotate the members of each pair of the friction-rollers in opposite directions, and a cutter F, supported on a plane between and behind the said pairs of friction-rollers and having its knives projecting in different directions into the path of feed of the material to be stripped, substantially as described.

5. In a stripping-machine, the combination, with a supporting-frame, of pairs of friction-rollers suitably geared to the driving mechanism, guides H, leading from the rear sides of the pairs of friction-rollers, and a cutter F, supported on a plane between and behind the said pairs of friction-rollers and having its knives projecting in different directions into the path of feed of the material to be stripped, substantially as described.

6. In a stripping-machine, the combination, with a supporting-frame, of pairs of friction-rollers C and D, suitably geared to the driving mechanism, and a cutter F, supported on a plane between the said pairs of friction-rollers, and comprising plates $k$ and $i$, carrying interposed anti-friction rollers, and knives G and G', projecting with their cutting ends toward each other through the said plates into the path of feed of the material to be stripped, substantially as described.

7. In a stripping-machine, the combination, with a supporting-frame, of pairs C and D of friction-rollers, suitably geared to the driving mechanism, and a cutter F, supported on a plane between the said pairs of friction-rollers, and comprising plates $k$ and $i$, carrying interposed anti-friction rollers, and knives G and G', formed of threaded stems, sharpened to afford cutting ends and adjustably secured to extend, respectively, through the plates $k$ and $i$, with their cutting ends in the path of the material to be stripped, substantially as described.

8. In a stripping-machine, the combination, with a supporting-frame, of pairs C and D of friction-rollers, suitably geared to the driving mechanism, and a cutter F, supported on a plane between and behind the said pairs of friction-rollers, and comprising plates $k$ and $i$, carrying interposed anti-friction rollers, cross-heads $h$ and $h'$, supported, respectively, at their opposite ends on the shafts of the forward set of anti-friction rollers projecting beyond the said plates, and knives G and G', comprising threaded stems $g$, sharpened to form cutting ends, extended, respectively, through the cross-heads $h$ and $h'$, and plates $k$ and $i$, with their cutting ends in the path of the material to be stripped, and nuts $f$ on the stems $g$, for adjustably securing them in place, substantially as described.

In witness whereof I have hereunto subscribed my name in the presence of two witnesses.

DUNCAN THATCHER.

Witnesses:
DOUGLAS DYRENFORTH,
BRUCE S. ELLIOTT.